US012592523B2

(12) United States Patent
Yao et al.

(10) Patent No.: US 12,592,523 B2
(45) Date of Patent: Mar. 31, 2026

(54) ELECTRICAL CONNECTOR WITH IMPROVED GROUND SHIELDING EFFECT

(71) Applicant: DONGGUAN LUXSHARE TECHNOLOGIES CO., LTD, Dongguan (CN)

(72) Inventors: Kunlin Yao, Dongguan (CN); Huizhen Xiang, Dongguan (CN)

(73) Assignee: DONGGUAN LUXSHARE TECHNOLOGIES CO., LTD, Dongguan City (CN)

( * ) Notice: Subject to any disclaimer, the term of this patent is extended or adjusted under 35 U.S.C. 154(b) by 350 days.

(21) Appl. No.: 18/380,728

(22) Filed: Oct. 17, 2023

(65) Prior Publication Data

US 2025/0087945 A1 Mar. 13, 2025

(30) Foreign Application Priority Data

Sep. 7, 2023 (CN) ........................ 202311157321.8

(51) Int. Cl.
*H01R 13/6585* (2011.01)
*H01R 13/6471* (2011.01)

(52) U.S. Cl.
CPC ..... *H01R 13/6585* (2013.01); *H01R 13/6471* (2013.01)

(58) Field of Classification Search
CPC ............ H01R 13/6585; H01R 13/6471; H01R 31/08; H01R 12/727; H01R 12/716; H01R 12/721; H01R 12/73; H01R 13/6597; H01R 13/40; H01R 13/02; H01R 13/502
See application file for complete search history.

(56) References Cited

U.S. PATENT DOCUMENTS 5,542,851 A * 8/1996 Chikano ............ H01R 13/6582 439/607.05
8,753,148 B2 * 6/2014 Wozniak .............. H01R 12/585 439/607.05

(Continued)

FOREIGN PATENT DOCUMENTS

CN 108649366 B 11/2019
CN 218919466 U 4/2023

(Continued)

*Primary Examiner* — Truc T Nguyen
(74) *Attorney, Agent, or Firm* — Birch, Stewart, Kolasch & Birch, LLP

(57) ABSTRACT

An electrical connector includes a number of first conductive terminals and a first grounding sheet. Each first conductive terminal includes a first elastic arm. The first conductive terminals include a first signal terminal group, a first ground terminal and a second ground terminal. The first grounding sheet includes a first body portion, a first intermediate portion, a first abutting elastic arm and a second abutting elastic arm. The first intermediate portion includes a first contact tab contacting the first elastic arm of the first ground terminal and a second contact tab abutting against the first elastic arm of the second ground terminal. The first abutting elastic arm includes a first abutting portion abutting against the first elastic arm of the first ground terminal. The second abutting elastic arm includes a second abutting portion abutting against the first elastic arm of the second ground terminal.

20 Claims, 14 Drawing Sheets

(56) References Cited

U.S. PATENT DOCUMENTS

| | | | | |
|---|---|---|---|---|
| 8,764,464 | B2 * | 7/2014 | Buck | H01R 12/00 439/189 |
| 8,944,849 | B1 * | 2/2015 | Yang | H01R 13/6588 439/607.07 |
| 10,461,475 | B2 * | 10/2019 | Little | H01R 13/6658 |
| 2009/0221165 | A1 * | 9/2009 | Buck | H01R 13/6471 439/108 |
| 2012/0202380 | A1 * | 8/2012 | Lappoehn | H01R 13/6587 439/607.09 |
| 2012/0282808 | A1 * | 11/2012 | Luo | H01R 13/6471 439/628 |
| 2015/0031240 | A1 * | 1/2015 | Yang | H01R 13/6588 439/607.08 |
| 2019/0020152 | A1 * | 1/2019 | Little | H01R 13/6587 |
| 2020/0313358 | A1 * | 10/2020 | Casher | H01R 13/6471 |
| 2020/0328541 | A1 * | 10/2020 | Lai | H01R 13/40 |
| 2021/0194187 | A1 | 6/2021 | Chen et al. | |
| 2021/0257789 | A1 * | 8/2021 | Chang | H01R 13/502 |
| 2021/0265784 | A1 * | 8/2021 | Hsiao | H01R 24/62 |
| 2023/0283020 | A1 * | 9/2023 | He | H01R 13/514 439/607.55 |
| 2024/0405471 | A1 * | 12/2024 | Yao | H01R 12/721 |
| 2024/0413588 | A1 * | 12/2024 | Chang | H01R 13/6597 |

FOREIGN PATENT DOCUMENTS

| | | | |
|---|---|---|---|
| CN | 116544691 | A | 8/2023 |
| TW | 202141867 | A | 11/2021 |
| TW | I797432 | B | 4/2023 |

* cited by examiner

ELECTRICAL CONNECTOR WITH IMPROVED GROUND SHIELDING EFFECT

CROSS-REFERENCE TO RELATED APPLICATION

This patent application claims priority of a Chinese Patent Application No. 202311157321.8, filed on Sep. 7, 2023 and titled "ELECTRICAL CONNECTOR", the entire content of which is incorporated herein by reference.

TECHNICAL FIELD

The present disclosure relates to an electrical connector, which belongs to the technical field of connectors.

BACKGROUND

An electrical connector in the related art generally includes an insulating body and a terminal module assembled to the insulating body. The terminal module includes an insulating block, a plurality of conductive terminals fixed to the insulating block and a grounding plate mounted to the insulating block. Each conductive terminal includes a main body portion and an elastic arm extending beyond the insulating block. The plurality of conductive terminals include a plurality of signal terminals and a plurality of ground terminals. The grounding sheet includes a plurality of contacting portions in contact with corresponding ground terminals, so as to connect all the ground terminals in series, thereby playing a better role of ground shielding.

However, with the continuous improvement of the signal transmission quality of the electrical connector, there is still room for improvement in terms of ground shielding in the related art.

SUMMARY

An object of the present disclosure is to provide an electrical connector with improved ground shielding effect.

In order to achieve the above object, the present disclosure adopts the following technical solution: an electrical connector, including: an insulating body including a mating surface and a mating slot extending through the mating surface along a first direction; and a first terminal module including a plurality of first conductive terminals and a first grounding sheet; each first conductive terminal including a first main body portion and a first elastic arm extending from the first main body portion; the first elastic arm including a first mating portion protruding into the mating slot; wherein the plurality of first conductive terminals include a first signal terminal group, a first ground terminal located on one side of the first signal terminal group along a second direction, and a second ground terminal located on another side of the first signal terminal group along the second direction; the first direction and the second direction are perpendicular to each other; the first signal terminal group includes a first signal terminal and a second signal terminal; wherein the first grounding sheet includes a first body portion, a first intermediate portion connected to the first body portion, a first abutting elastic arm connected to the first intermediate portion, and a second abutting elastic arm connected to the first intermediate portion; the first body portion includes a first contacting portion in contact with the first main body portion of the first ground terminal, a second contacting portion in contact with the first main body portion of the second ground terminal, and a first avoidance portion connecting the first contacting portion and the second contacting portion; the first avoidance portion is configured to avoid the first signal terminal group so as not to contact the first signal terminal group; the first intermediate portion includes a first contact tab in contact with the first elastic arm of the first ground terminal and a second contact tab abutting against the first elastic arm of the second ground terminal; the first abutting elastic arm of the first grounding sheet includes a first abutting portion abutting on the first elastic arm of the first ground terminal; the second abutting elastic arm of the first grounding sheet includes a second abutting portion abutting on the first elastic arm of the second ground terminal; the first abutting portion and the first contact tab are disposed at intervals along the first direction; the second abutting portion and the second contact tab are disposed at intervals along the first direction.

Compared with the prior art, the first grounding sheet in the present disclosure includes the first intermediate portion, the first abutting elastic arm and the second abutting elastic arm. The first intermediate portion includes the first contact tab in contact with the first elastic arm of the first ground terminal and a second contact tab abutting against the first elastic arm of the second ground terminal. The first abutting elastic arm includes a first abutting portion abutting against the first elastic arm of the first ground terminal. The second abutting elastic arm includes a second abutting portion abutting against the first elastic arm of the second ground terminal. In this way, double contacts are formed by the first grounding sheet and the first elastic arm of the first ground terminal; and double contacts are formed by the first grounding sheet and the first elastic arm of the second ground terminal. As a result, on the one hand, the ground shielding effect of the electrical connector is improved, and the crosstalk is reduced; on the other hand, it is beneficial to improve the reliability of the first elastic arm of the first ground terminal and the first elastic arm of the second ground terminal, and reduce the risk of deformation failure thereof.

DETAILED DESCRIPTION

Figure 1:
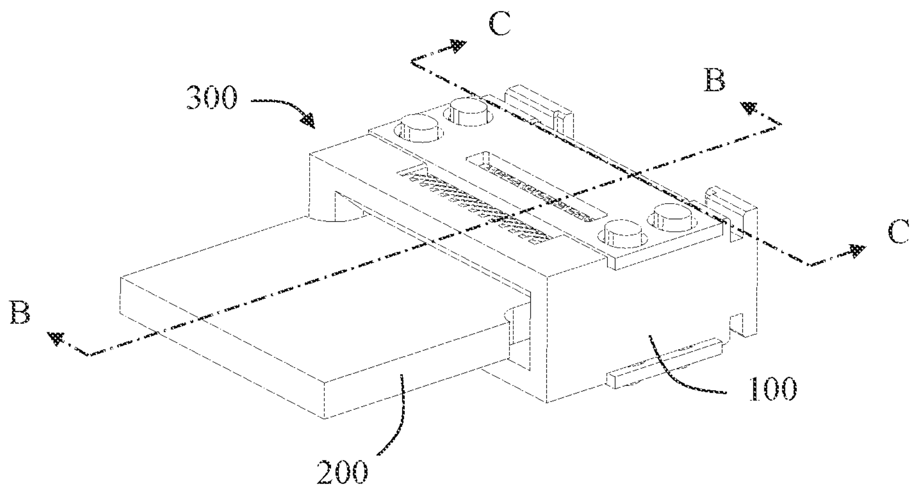
FIG. 1 is a schematic perspective view of a connector assembly in accordance with an embodiment of the present disclosure.
Figure 2:
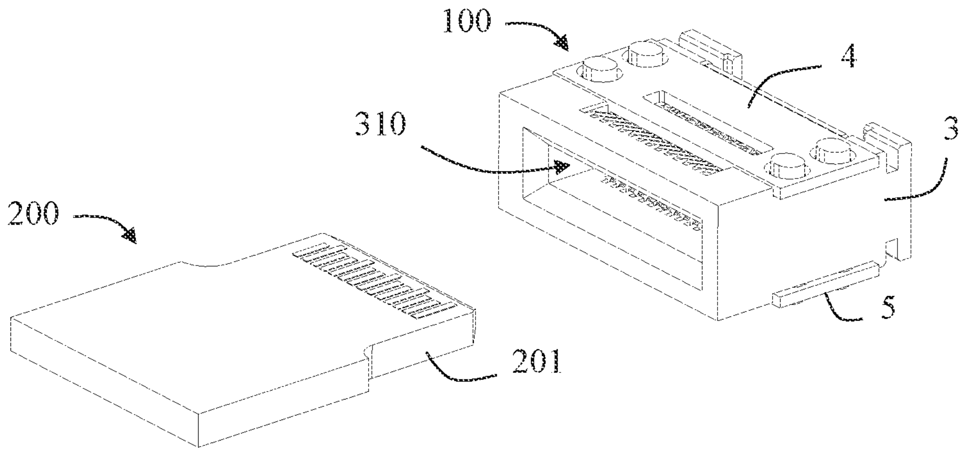
FIG. 2 is a partial perspective exploded view of FIG. 1.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIGS. 1 to 4, the present disclosure discloses a connector assembly 300 which includes an electrical connector 100 and a mating connector 200 mated with the electrical connector 100. In one embodiment of the present disclosure, the electrical connector 100 is a cable connector. Of course, in other embodiments, the electrical connector 100 may also be a board-end connector for being mounted on a circuit board.

Figure 3:
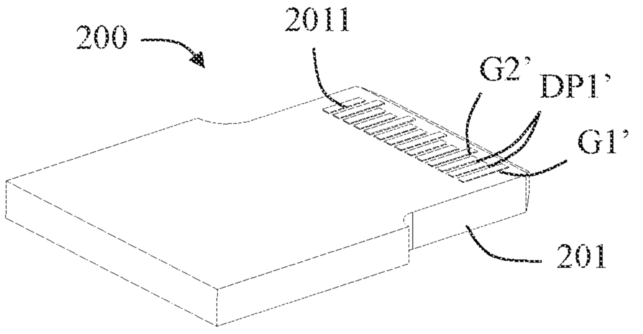
FIG. 3 is a schematic perspective view of a mating connector in FIG. 2.
Figure 4:
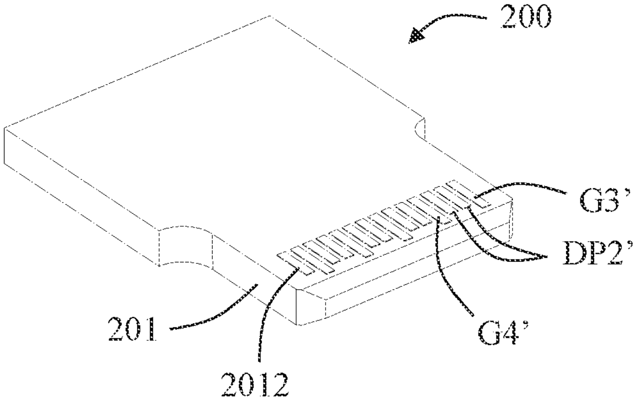
FIG. 4 is a schematic perspective view of FIG. 3 from another angle.

Referring to FIG. 3 and FIG. 4, the mating connector 200 includes a tongue plate 201 for being at least partially inserted into the electrical connector 100. A plurality of first conductive pads 2011 and a plurality of second conductive pads 2012 are provided on an upper surface and a lower surface of the tongue plate 201, respectively. In the illustrated embodiment of the present disclosure, the plurality of first conductive pads 2011 include a plurality of first differential pair conductive pads DP1', a plurality of first ground conductive pads G1', and a plurality of second ground conductive pads G2'. Two sides of each first differential pair conductive pads DP1' are associated with one first ground conductive pad G1' and one second ground conductive pad G2', respectively. Similarly, the plurality of second conductive pads 2012 include a plurality of second differential pair conductive pads DP2', a plurality of third ground conductive pads G3", and a plurality of fourth ground conductive pads G4'. Two sides of each second differential pair conductive pads DP2' are associated with one third ground conductive pad G3' and one fourth ground conductive pad G4", respectively.

Figure 5:
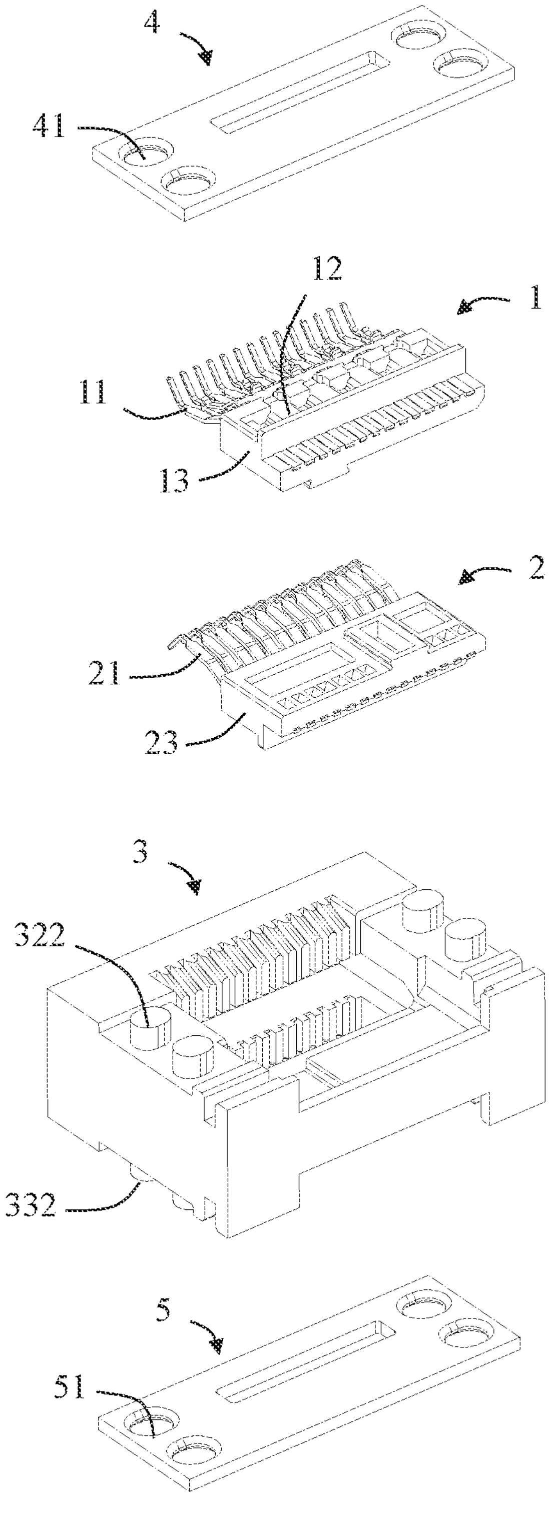
FIG. 5 is a partially exploded perspective view of an electrical connector of the present disclosure.

Referring to FIG. 5, the electrical connector 100 includes an insulating body 3, a first terminal module I installed to the insulating body 3, a second terminal module 2 installed to the insulating body 3, a first conductive plate 4 installed to the insulating body 3, and a second conductive plate 5 installed to the insulating body 3.

Figure 6:
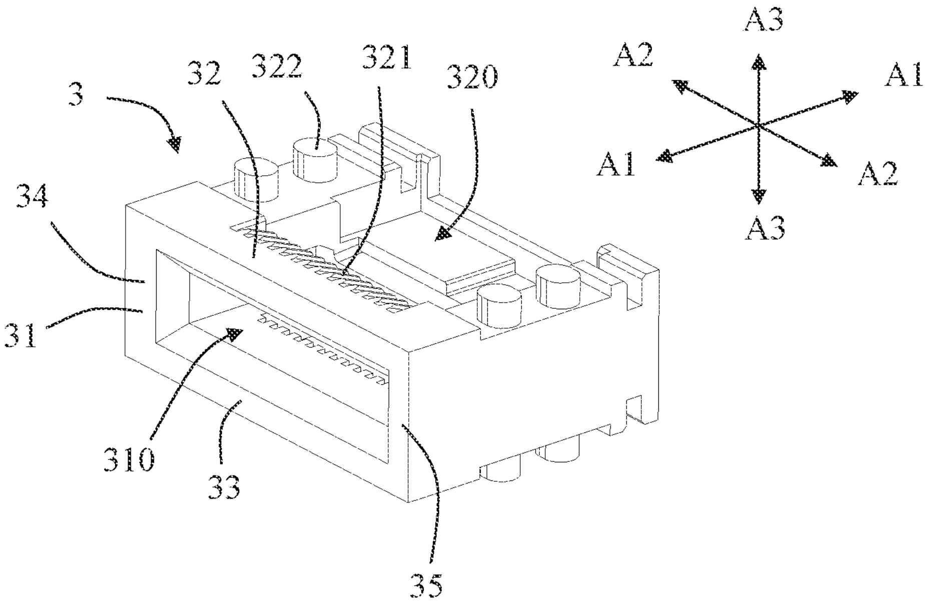
FIG. 6 is a perspective schematic view of an insulating body in FIG. 5.
Figure 7:
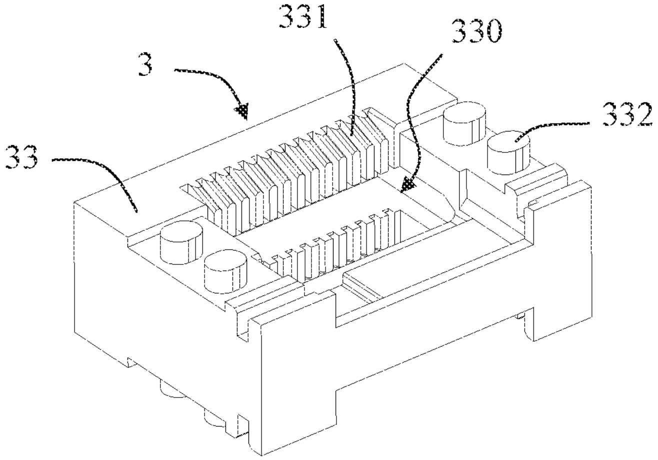
FIG. 7 is a schematic perspective view of FIG. 6 from another angle.
Figure 8:
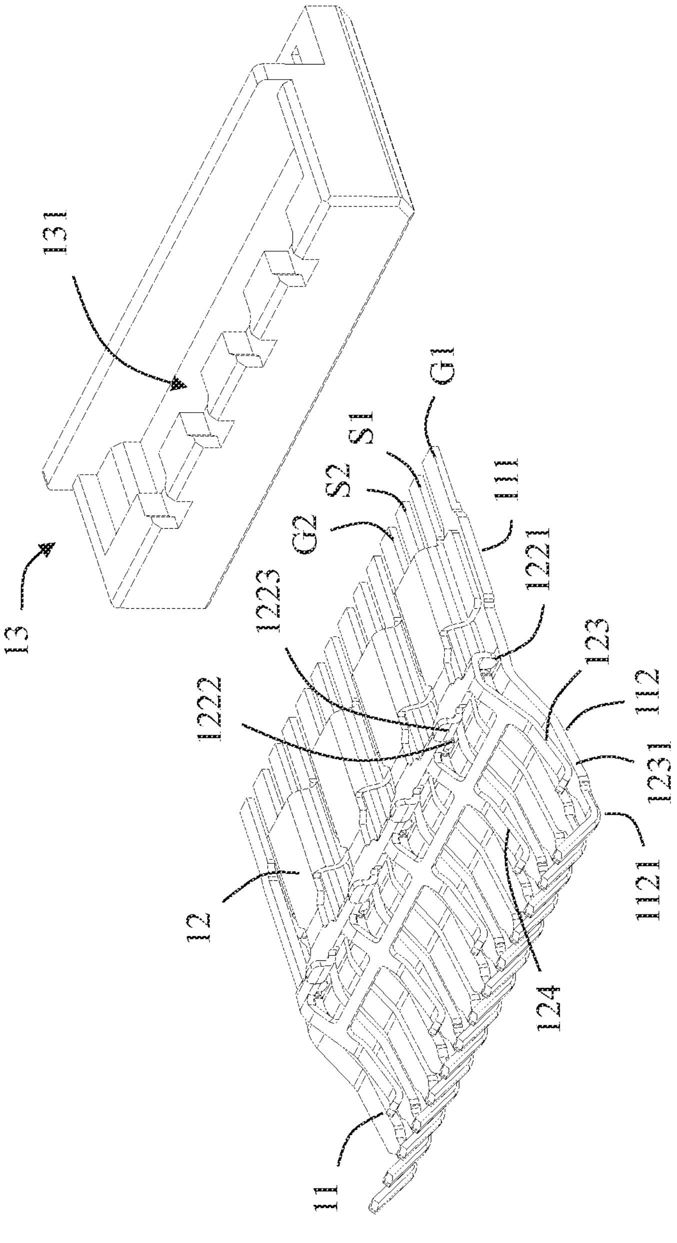
FIG. 8 is a partial perspective exploded view of a first terminal module.
Figure 9:
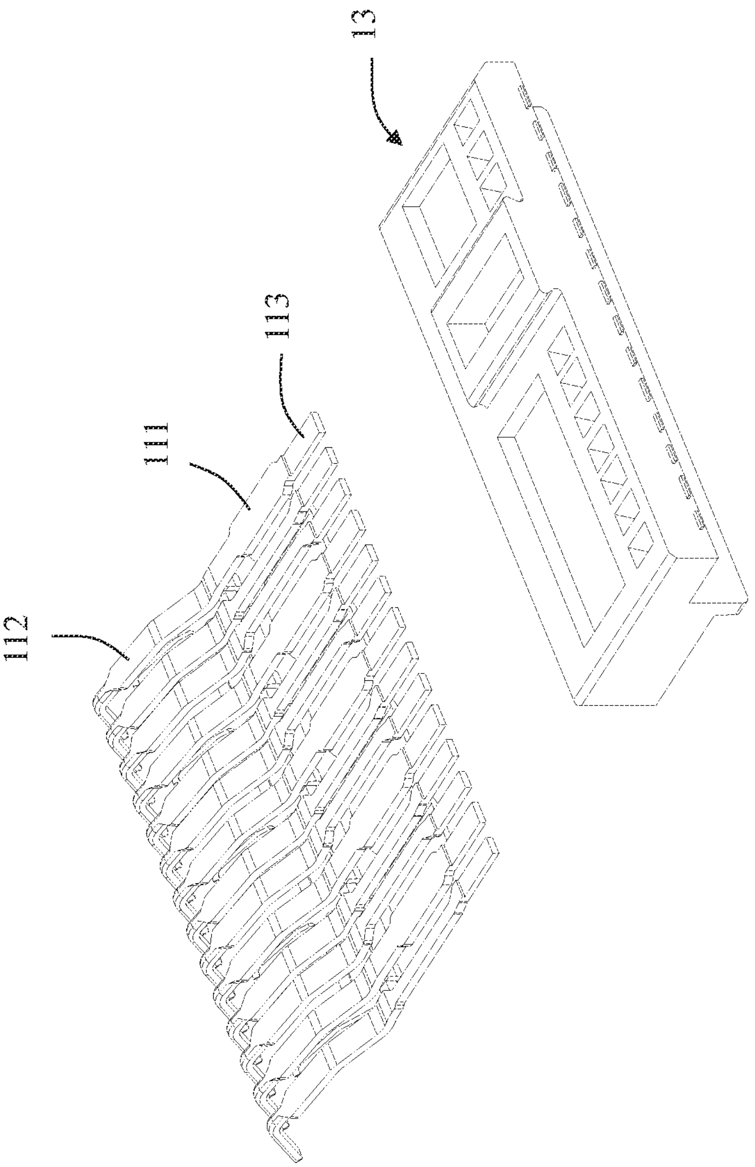
FIG. 9 is a partial perspective exploded view of FIG. 8 from another angle.
Figure 10:
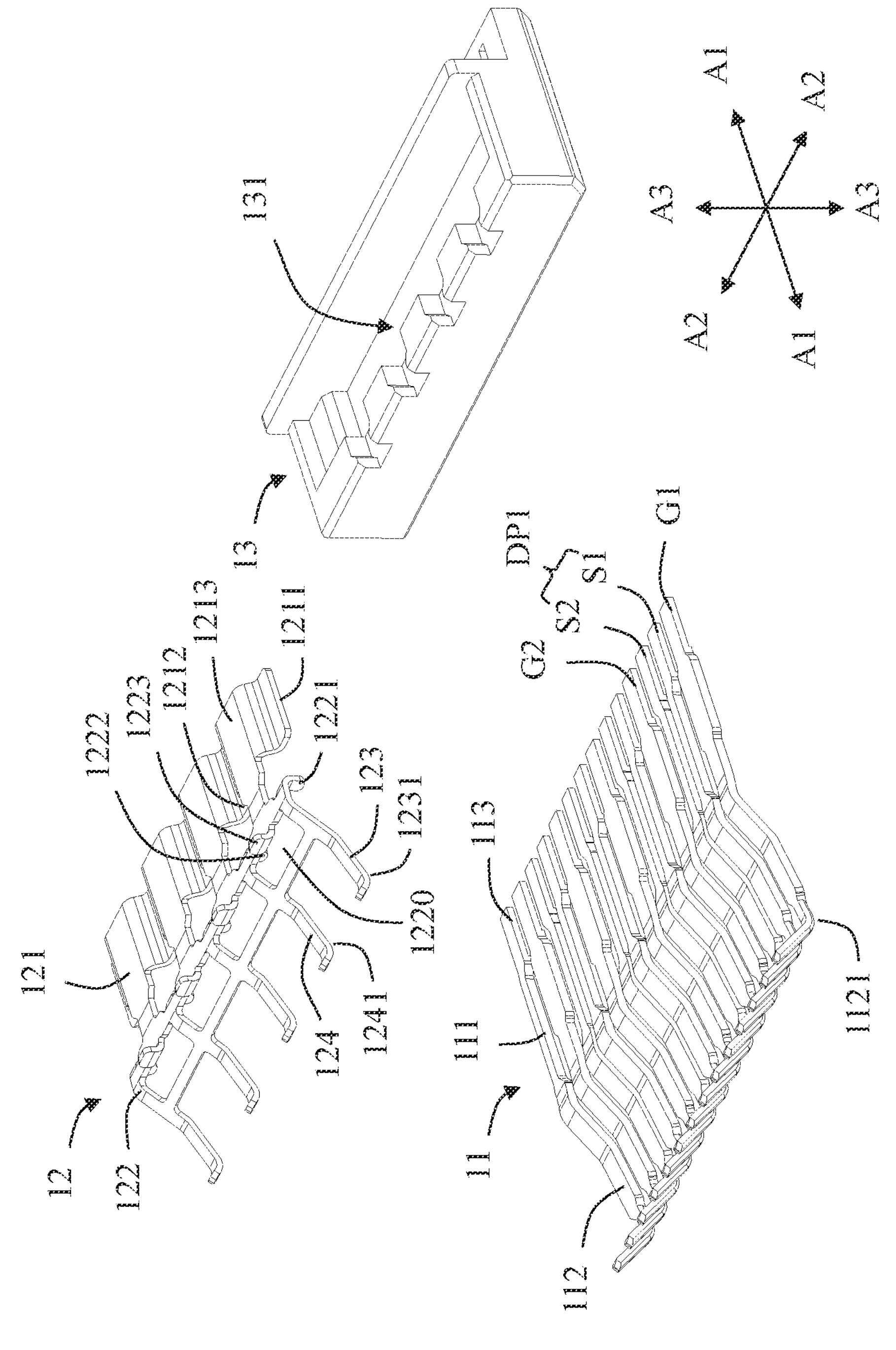
FIG. 10 is a further perspective exploded view of FIG. 8.
Figure 11:
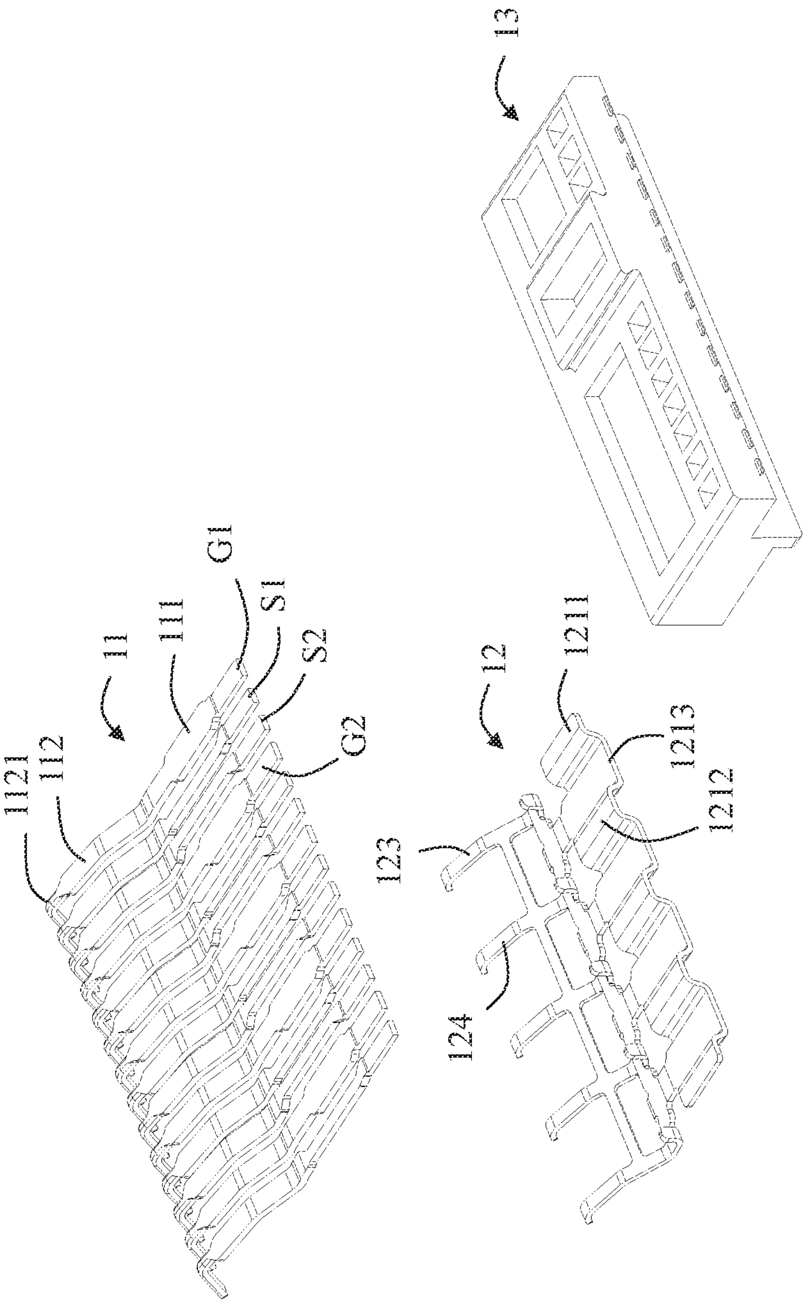
FIG. 11 is a perspective exploded view of FIG. 10 from another angle.
Figure 12:
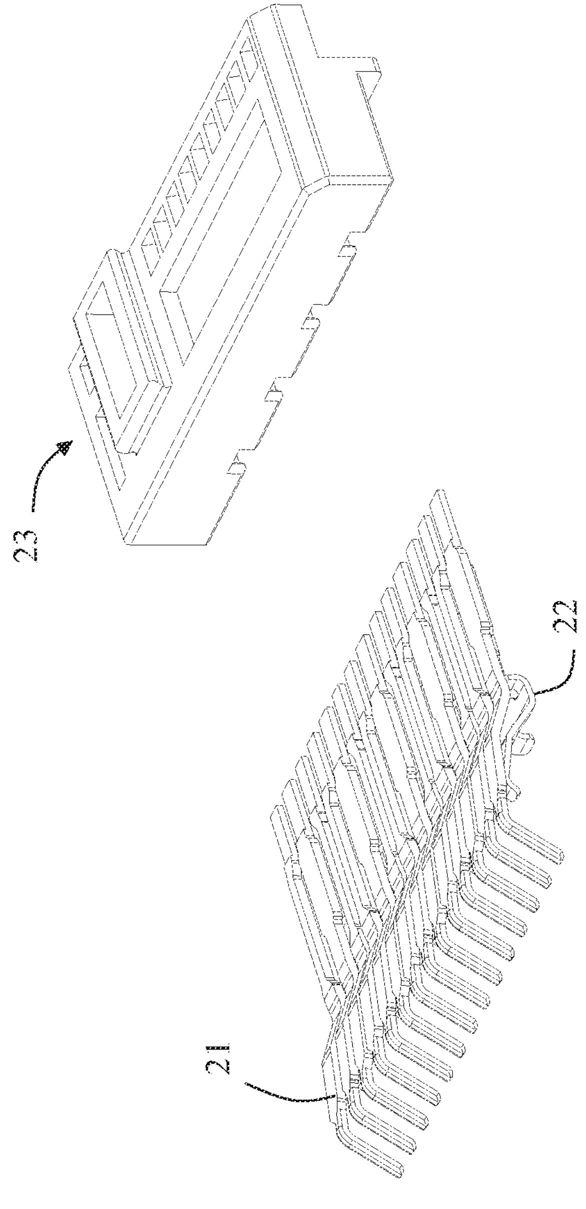
FIG. 12 is a partial perspective exploded view of a second terminal module.
Figure 13:
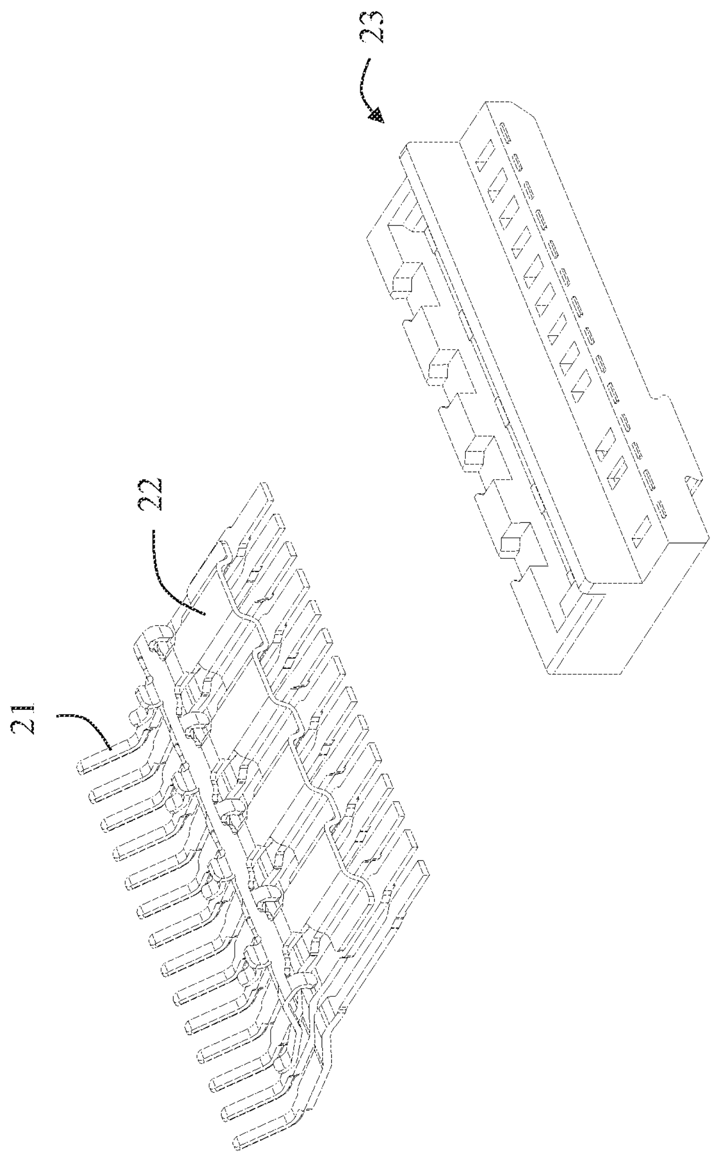
FIG. 13 is a partial perspective exploded view of FIG. 12 from another angle.
Figure 14:
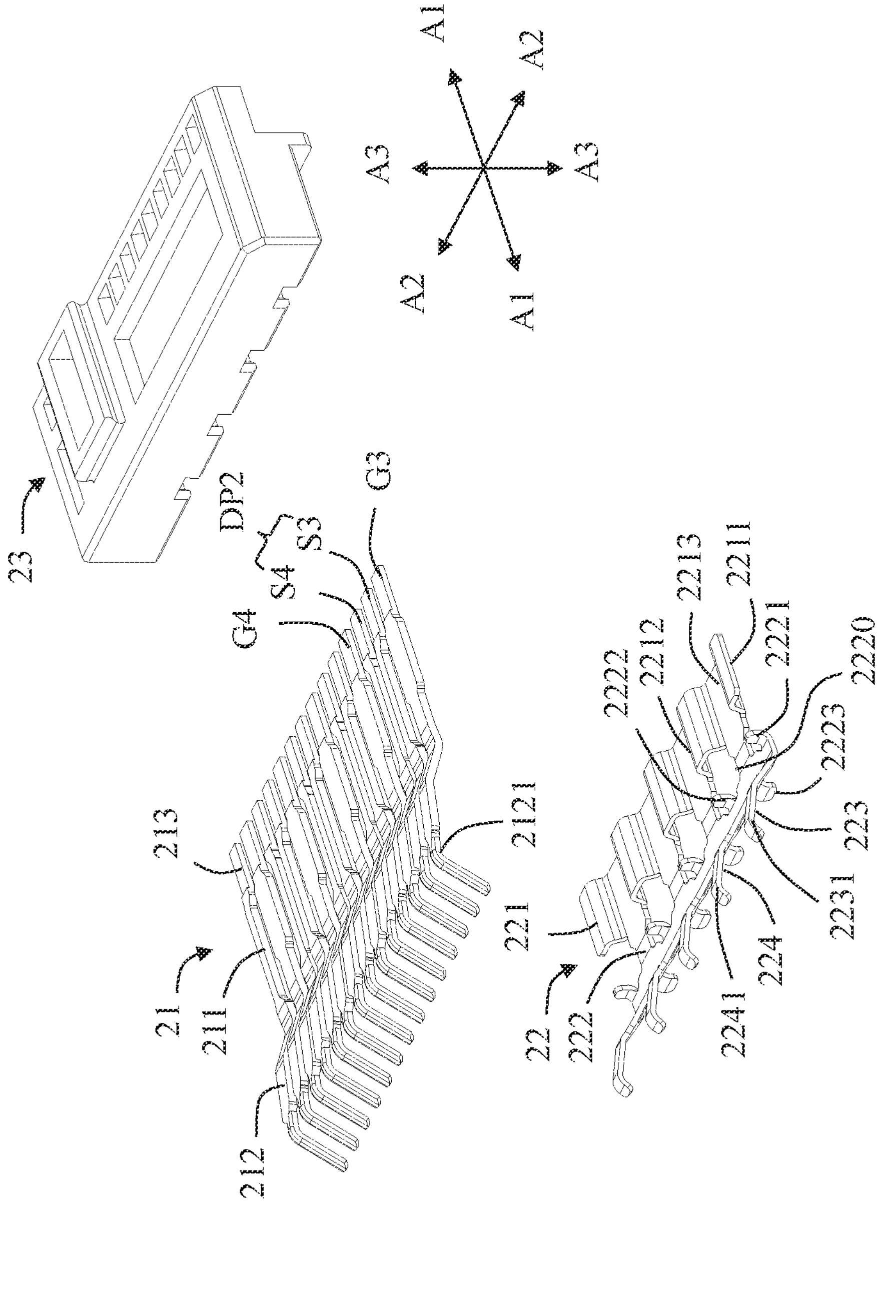
FIG. 14 is a further perspective exploded view of FIG. 12.
Figure 15:
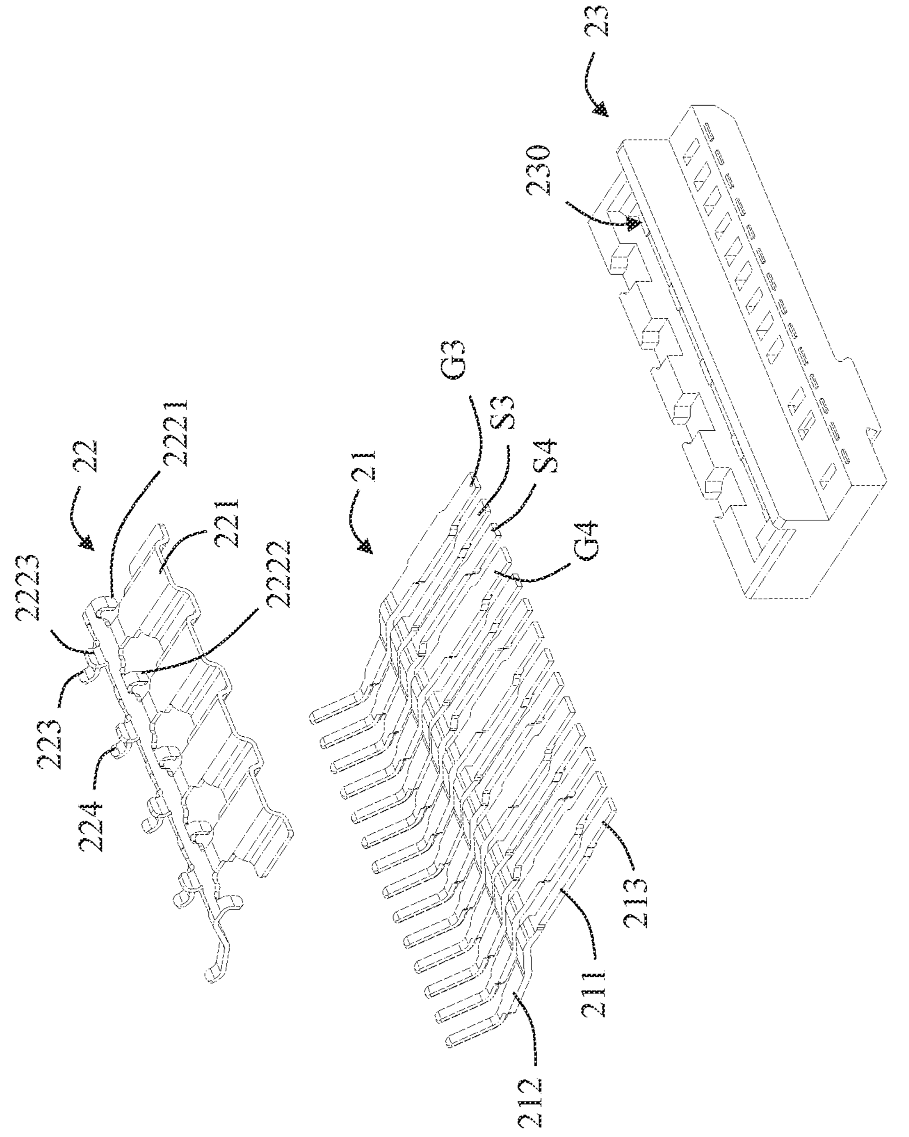
FIG. 15 is a perspective exploded view of FIG. 14 from another angle.
Figure 16:
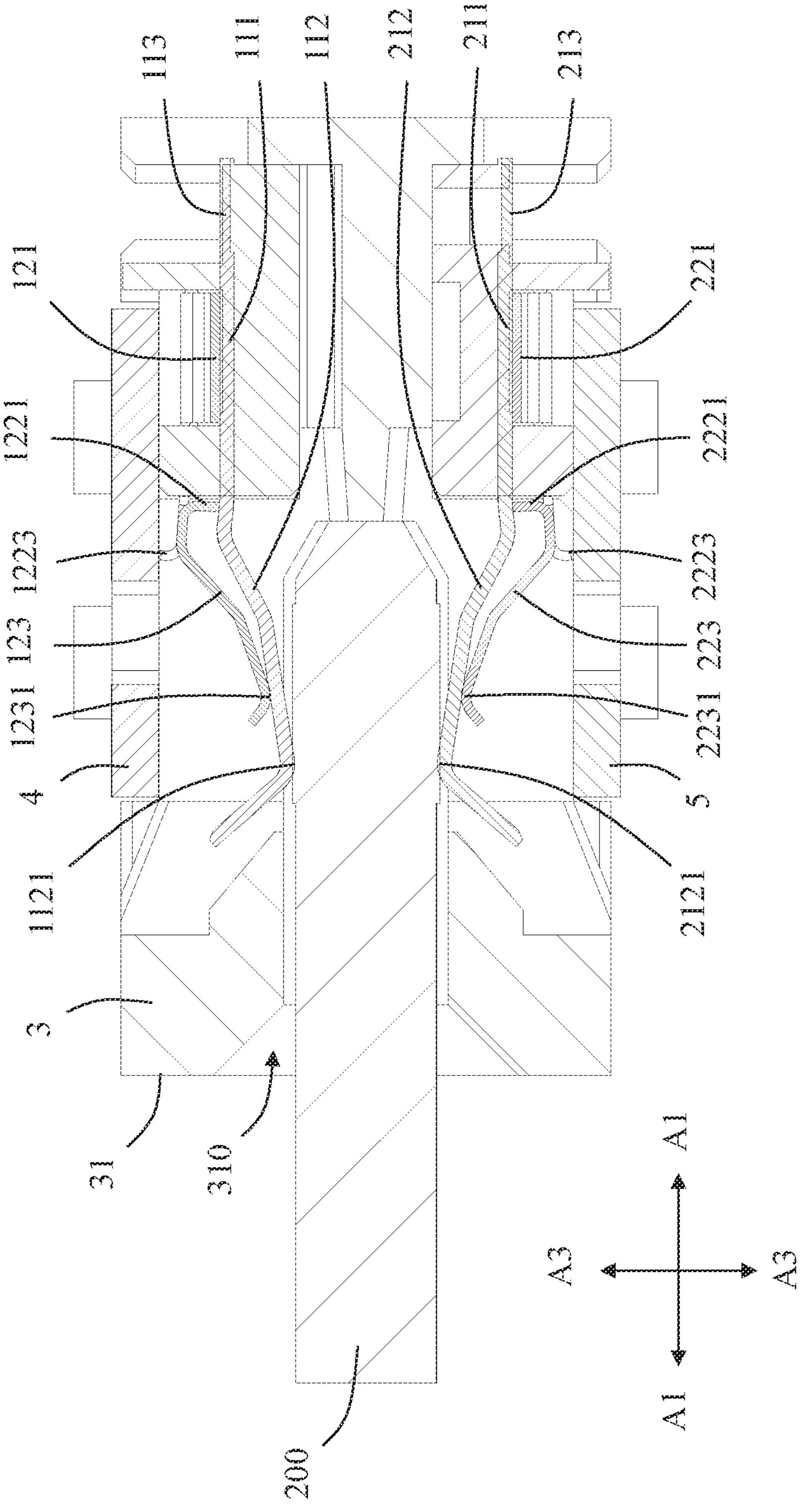
FIG. 16 is a schematic cross-sectional view taken along line B-B in FIG. 1.
Figure 17:
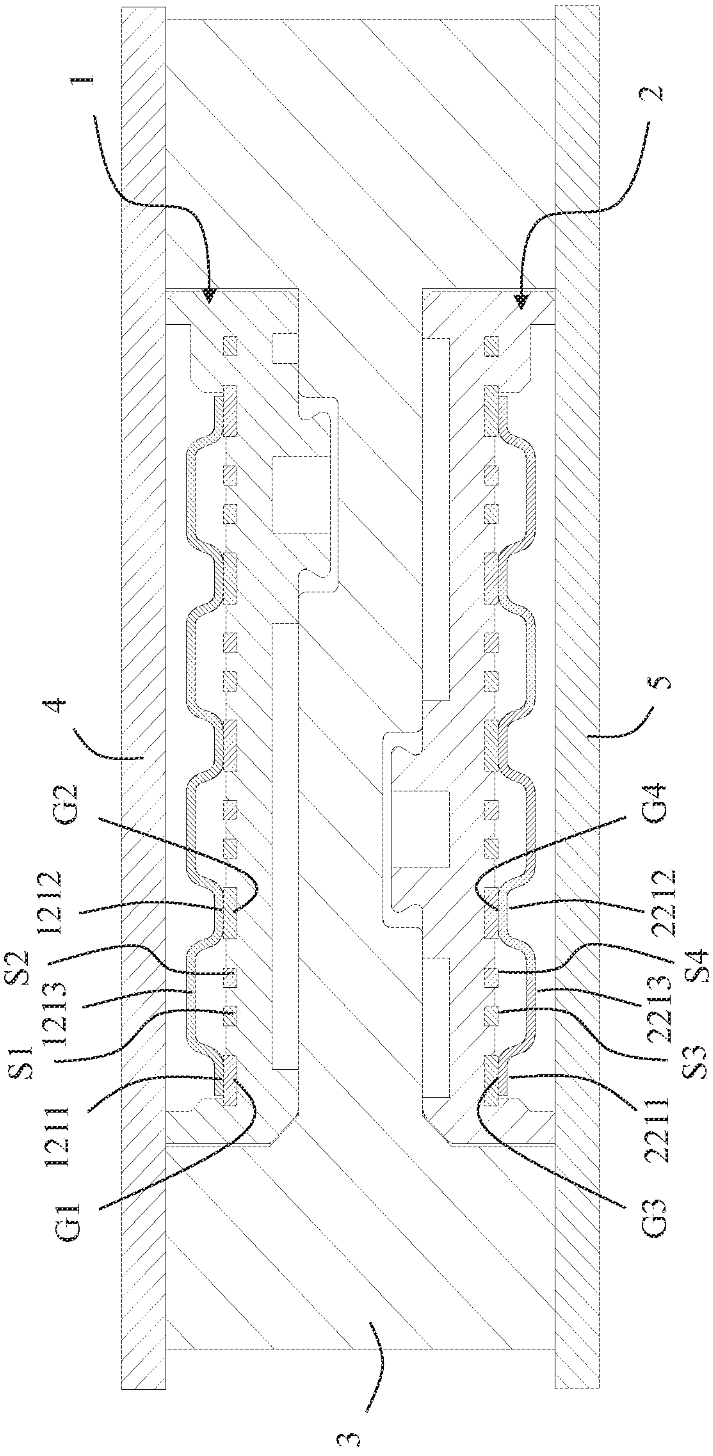
FIG. 17 is a schematic cross-sectional view taken along line C-C in FIG. 1.

Referring to FIG. 6 and FIG. 7, in the illustrated embodiment of the present disclosure, the insulating body 3 includes a mating surface 31, a mating slot 310 extending through the mating surface 31 along a first direction A-A1 (for example, a front-rear direction), a top wall 32, a bottom wall 33, a first side wall 34 and a second side wall 35. The mating slot 310 is jointly defined by the top wall 32, the bottom wall 33, the first side wall 34 and the second side wall 35. The mating slot 310 is used for at least partially receiving the tongue plate 201 of the mating connector 200.

In the illustrated embodiment of the present disclosure, the top wall 32 defines a first receiving space 320 extending upwardly through the top wall 32 along a third direction A3-A3 (for example, a vertical direction) and a plurality of first positioning grooves 321 communicating with the first receiving space 320. The first receiving space 320 and the first positioning grooves 321 communicate with the mating slot 310. Besides, the top wall 32 further includes a plurality of first installation posts 322 protruding upwardly.

Similarly, in the illustrated embodiment of the present disclosure, the bottom wall 33 defines a second receiving space 330 extending downwardly through the bottom wall 33 along the third direction A3-A3 (for example, the vertical direction) and a plurality of second positioning grooves 331 communicating with the second receiving space 330. The second receiving space 330 and the second positioning grooves 331 communicate with the mating slot 310. Besides, the bottom wall 33 further includes a plurality of second installation posts 332 protruding downwardly.

A material of the first conductive plate 4 is metal or conductive plastic, or a composite material in which an inner layer is plastic and an outer layer is metal. The first conductive plate 4 defines a plurality of first installation holes 41, and the first installation posts 322 are inserted and fixed in the first installation holes 41.

A material of the second conductive plate 5 is metal or conductive plastic, or a composite material in which an inner layer is plastic and an outer layer is metal. The second conductive plate 5 defines a plurality of second installation holes 51, and the second installation posts 332 are inserted and fixed in the second installation holes 51.

Referring to FIG. 5 and FIG. 6 to FIG. 11, the first terminal module 1 includes a first insulating block 13, a plurality of first conductive terminals 11 fixed to the first insulating block 13, and a first grounding sheet 12 installed to the first insulating block 13. Each first conductive terminal 11 includes a first main body portion 111, a first elastic arm 112 extending from the first main body portion 111 and a first tail portion 113 extending from the first main body portion 111. The first elastic arm 112 includes a first mating portion 1121 protruding into the mating slot 310. The first tail portion 113 is configured to electrically connect with a cable (not shown). In the illustrated embodiment of the present disclosure, the first terminal module 1 is installed in the first receiving space 320 along the third direction A3-A3. The first elastic arm 112 is received in a corresponding first positioning groove 321.

In an embodiment of the present disclosure, the plurality of first conductive terminals 11 are insert-molded with the first insulating block 13. Of course, it is understandable to those skilled in the art that the plurality of first conductive terminals 11 can also be fixed to the first insulating block 13 by means of assembling or the like. The first insulating block 13 defines a first installation groove 131. The first main body portions 111 of the first conductive terminals 11 are partially exposed in the first installation groove 131. The first installation groove 131 is used for installing the first grounding sheet 12.

The plurality of first conductive terminals 11 include a first signal terminal group DP1, a first ground terminal G1 located on one side of the first signal terminal group DP1 along a second direction A2-A2 (for example, a left-right direction), and a second ground terminal G2 located on the other side of the first signal terminal group DP1 along the second direction A2-A2. Each two of the first direction A1-A1, the second direction A2-A2 and the third direction A3-A3 are perpendicular to each other. The first signal terminal group DP1 includes a first signal terminal S1 and a second signal terminal S2. In the illustrated embodiment of the present disclosure, the first signal terminal S1 and the second signal terminal S2 form a differential pair.

The first grounding sheet 12 includes a first body portion 121, a first intermediate portion 122 connected with the first body portion 121, a plurality of first abutting elastic arms 123 connected with the first intermediate portion 122, and a plurality of second abutting elastic arms 124 connected with the first intermediate portion 122.

The first body portion 121 is substantially wavy, and includes a first contacting portion 1211 in contact with the first main body portion 111 of the first ground terminal G1, a second contacting portion 1212 in contact with the first main body portion 111 of the second ground terminal G2, and a first avoidance portion 1213 connecting the first contacting portion 1211 and the second contacting portion 1212. The first avoidance portion 1213 is of a raised configuration. The first avoidance portion 1213 is configured to avoid the first signal terminal group DP1 so as not to contact the first signal terminal group DP1 to prevent short circuit.

The first intermediate portion 122 includes a first contact tab 1221 in contact with the first elastic arm 112 of the first ground terminal G1, a second contact tab 1222 abutting against the first elastic arm 112 of the second ground terminal G2, and a first support tab 1223 extending away from the first contact tab 1221 and the second contact tab 1222. In the illustrated embodiment of the present disclosure, the first intermediate portion 122 defines a plurality of first hollow grooves 1220 disposed at intervals along the second direction A2-A2. The first contact tab 1221 and the second contact tab 1222 are bent downwardly from a rear edge of the first intermediate portion 122. The first support tab 1223 is bent upwardly, and the first support tab 1223 corresponds to the first hollow groove 1220 along the third direction A3-A3.

The first abutting elastic arm 123 of the first grounding sheet 12 includes a first abutting portion 1231 abutting on the first elastic arm 112 of the first ground terminal G1. The second abutting elastic arm 124 of the first grounding sheet 12 includes a second abutting portion 1241 abutting on the first elastic arm 112 of the second ground terminal G2. The first abutting portion 1231 is spaced apart from the first contact tab 1221 along the first direction A1-A1. The second abutting portion 1241 is spaced apart from the second contact tab 1222 along the first direction A1-A1.

In the illustrated embodiment of the present disclosure, along the first direction A1-A1, the first abutting portion 1231 is located between the first mating portion 1121 of the first ground terminal G1 and the first contact tab 1221. Similarly, along the first direction A1-A1, the second abutting portion 1241 is located between the first mating portion 1121 of the second ground terminal G2 and the second contact tab 1222

A width of the first abutting elastic arm 123 of the first grounding sheet 12 along the second direction A2-A2 is generally narrower than a width of the first elastic arm 112 of the first ground terminal G1 along the second direction A2-A2. Similarly, a width of the second abutting elastic arm 124 of the first grounding sheet 12 along the second direction A2-A2 is generally narrower than a width of the first elastic arm 112 of the second ground terminal G2 along the second direction A2-A2.

Along the first direction A1-A1, the first support tab 1223 is located between the first contact tab 1221 and the first abutting portion 1231. Along the second direction A2-A2, the first support tab 1223 is located between the first abutting elastic arm 123 and the second abutting elastic arm 124. The first conductive plate 4 presses against the first support tab 1223 along the third direction A3-A3. With such arrangement, on the one hand, it can improve the ground shielding effect; on the other hand, it is beneficial to better support the first grounding sheet 12 to increase the resisting force of the first abutting elastic arm 123 and the second abutting elastic arm 124.

The first elastic arm 112 of each first conductive terminal 11 extends forwardly beyond the first insulating block 13. The first contact tab 1221 abuts against a root/rear end of the first elastic arm 112 of the first ground terminal G1, so as to reduce the impact on the elasticity of the first elastic arm 112 of the first ground terminal G1 as much as possible. The second contact tab 1222 abuts against a root/rear end of the first elastic arm 112 of the second ground terminal G2, so as to reduce the impact on the elasticity of the first elastic arm 112 of the second ground terminal G2 as much as possible.

Referring to FIG. 5 and FIG. 12 to FIG. 15, the second terminal module 2 includes a second insulating block 23, a plurality of second conductive terminals 21 fixed to the second insulating block 23, and a second grounding sheet 22 installed to the second insulating block 23 Each second conductive terminal 21 includes a second main body portion 211, a second elastic arm 212 extending from the second main body portion 211 and a second tail portion 213 extending from the second main body portion 211. The second elastic arm 212 includes a second mating portion 2121 protruding into the mating slot 310. The second tail portion 213 is configured to electrically connect with a cable (not shown). In the illustrated embodiment of the present disclosure, the second terminal module 2 is installed in the second receiving space 330 along the third direction A3-A3. The second elastic arm 212 is received in a corresponding second positioning groove 331.

In an embodiment of the present disclosure, the plurality of second conductive terminals 21 are insert-molded with the second insulating block 23. Of course, it is understandable to those skilled in the art that the plurality of second conductive terminals 21 can also be fixed to the second insulating block 23 by means of assembling or the like. The second insulating block 23 defines a second installation groove 231, and the second main body portions 211 of the second conductive terminals 21 are partially exposed in the second installation groove 231. The second installation groove 231 is used for installing the second grounding sheet 22.

The plurality of second conductive terminals 21 include a second signal terminal group DP2, a third ground terminal G3 located on one side of the second signal terminal group DP2 along the second direction A2-A2, and a fourth ground terminal G4 located on the other side of the second signal terminal group DP2 along the second direction A2-A2. The second signal terminal group DP2 includes a third signal terminal S3 and a fourth signal terminal S4. In the illustrated embodiment of the present disclosure, the third signal terminal S3 and the fourth signal terminal S4 form a differential pair.

The second grounding sheet 22 includes a second body portion 221, a second intermediate portion 222 connected with the second body portion 221, a plurality of third abutting elastic arms 223 connected with the second intermediate portion 222, and a plurality of fourth abutting elastic arms 224 connected with the second intermediate portion 222.

The second body portion 221 is substantially wavy, and includes a third contacting portion 2211 in contact with the second main body portion 211 of the third ground terminal G3, a fourth contacting portion 2212 in contact with the second main body portion 211 of the fourth ground terminal G4, and a second avoidance portion 2213 connecting the third contacting portion 2211 and the fourth contacting portion 2212. The second avoidance portion 2213 is of a recessed configuration. The second avoidance portion 2213 is configured to avoid the second signal terminal group DP2 so as not to contact the second signal terminal group DP2 to prevent short circuit.

The second intermediate portion 222 includes a third contact tab 2221 in contact with the second elastic arm 212 of the third ground terminal G3, a fourth contact tab 2222 abutting against the second elastic arm 212 of the fourth ground terminal G4, and a second support tab 2223 extending away from the third contact tab 2221 and the fourth contact tab 2222. In the illustrated embodiment of the present disclosure, the second intermediate portion 222 defines a plurality of second hollow grooves 2220 disposed at intervals along the second direction A2-A2 The third contact tab 2221 and the fourth contact tab 2222 are bent downwardly from a rear edge of the second intermediate portion 222. The second support tab 2223 is bent upwardly. The second support tab 2223 corresponds to the second hollow groove 2220 along the third direction A3-A3.

The third abutting elastic arm 223 of the second grounding sheet 22 includes a third abutting portion 2231 abutting on the second elastic arm 212 of the third ground terminal G3. The fourth abutting elastic arm 224 of the second grounding sheet 22 includes a fourth abutting portion 2241 abutting against the second elastic arm 212 of the fourth ground terminal G4. The third abutting portion 2231 is spaced apart from the third contact tab 2221 along the first direction A1-A1. The fourth abutting portion 2241 is spaced apart from the fourth contact tab 2222 along the first direction A1-A1.

In the embodiment shown in the present disclosure, along the first direction A1-A1, the third abutting portion 2231 is located between the second mating portion 2121 of the third ground terminal G3 and the third contact tab 2221. Similarly, along the first direction A1-A1, the fourth abutting portion 2241 is located between the second mating portion 2121 of the fourth ground terminal G4 and the fourth contact tab 2222.

A width of the third abutting elastic arm 223 of the second grounding sheet 22 along the second direction A2-A2 is generally narrower than a width of the second elastic arm 212 of the third ground terminal G3 along the second direction A2-A2. Similarly, a width of the fourth abutting elastic arm 224 of the second grounding sheet 22 along the second direction A2-A2 is generally narrower than a width of the second elastic arm 212 of the fourth ground terminal G4 along the second direction A2-A2.

Along the first direction A1-A1, the second support tab 2223 is located between the third contact tab 2221 and the third abutting portion 2231. Along the second direction A2-A2, the second support tab 2223 is located between the third abutting elastic arm 223 and the fourth abutting elastic arm 224. The second conductive plate 5 presses against the second support tab 2223 along the third direction A3-A3. With such configuration, on the one hand, it can improve the ground shielding effect; on the other hand, it is beneficial to better support the second grounding sheet 22 to increase the resisting force of the third abutting elastic arm 223 and the fourth abutting elastic arm 224.

The second elastic arm 212 of each second conductive terminal 21 extends forwardly beyond the second insulating block 23. The third contact tab 2221 abuts against a root/rear end of the second elastic arm 212 of the third ground terminal G3, so as to reduce the impact on the elasticity of the second elastic arm 212 of the third ground terminal G3 as much as possible. The fourth contact tab 2222 abuts against a root/rear end of the second elastic arm 212 of the fourth ground terminal G4, so as to reduce the impact on the elasticity of the second elastic arm 212 of the fourth ground terminal G4 as much as possible.

Compared with the prior art, the first grounding sheet 12 of the present disclosure includes the first intermediate portion 122, the first abutting elastic arm 123 and the second abutting elastic arm 124. The first intermediate portion 122 includes the first contact tab 1221 in contact with the first elastic arm 112 of the first ground terminal G1 and the second contact tab 1222 abutting against the first elastic arm 112 of the second ground terminal G2. The first abutting elastic arm 123 includes the first abutting portion 1231 abutting on the first elastic arm 112 of the first ground terminal G1. The second abutting elastic arm 124 includes the second abutting portion 1241 abutting on the first elastic arm 112 of the second ground terminal G2. With such arrangement, double contacts are formed by the first grounding sheet 12 and the first elastic arm 112 of the first ground terminal G1. Double contacts are formed by the first grounding sheet 12 and the first elastic arm 112 of the second ground terminal G2. As a result, on the one hand, it improves the ground shielding effect of the electrical connector 100 and reduces crosstalk; on the other hand, it is beneficial to improve the reliability of the first elastic arm 112 of the first ground terminal G1 and the first elastic arm 112 of the second ground terminal G2, and reduce the risk of deformation failure thereof.

Similarly, the second grounding sheet 22 of the present disclosure includes the second intermediate portion 222, the third abutting elastic arm 223 and the fourth abutting elastic arm 224. The second intermediate portion 222 includes the third contact tab 2221 in contact with the second elastic arm 212 of the third ground terminal G3, and the fourth contact tab 2222 abutting against the second elastic arm 212 of the fourth ground terminal G4. The third abutting elastic arm 223 includes the third abutting portion 2231 abutting on the second elastic arm 212 of the third ground terminal G3. The fourth abutting elastic arm 224 includes the fourth abutting portion 2241 abutting on the second elastic arm 212 of the fourth ground terminal G4. With such arrangement, double contacts are formed by the second grounding sheet 22 and the second elastic arm 212 of the third ground terminal G3. Double contacts are formed by the second grounding sheet 22 and the second elastic arm 212 of the fourth ground terminal G4. As a result, on the one hand, the ground shielding effect of the electrical connector 100 is improved, and crosstalk is reduced; on the other hand, it is beneficial to improve the reliability of the second elastic arm 212 of the third ground terminal G3 and the second elastic arm 212 of the fourth ground terminal G4, and reduce the risk of deformation failure thereof.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. An electrical connector, comprising:

an insulating body comprising a mating surface and a mating slot extending through the mating surface along a first direction; and a first terminal module comprising a plurality of first conductive terminals and a first grounding sheet; each first conductive terminal comprising a first main body portion and a first elastic arm extending from the first main body portion; the first elastic arm comprising a first mating portion protruding into the mating slot;

wherein the plurality of first conductive terminals comprise a first signal terminal group, a first ground terminal located on one side of the first signal terminal group along a second direction, and a second ground terminal located on another side of the first signal terminal group along the second direction; the first direction and the second direction are perpendicular to each other; the first signal terminal group comprises a first signal terminal and a second signal terminal;

wherein the first grounding sheet comprises a first body portion, a first intermediate portion connected to the first body portion, a first abutting elastic arm connected to the first intermediate portion, and a second abutting elastic arm connected to the first intermediate portion; the first body portion comprises a first contacting portion in contact with the first main body portion of the first ground terminal, a second contacting portion in contact with the first main body portion of the second ground terminal, and a first avoidance portion connecting the first contacting portion and the second contacting portion; the first avoidance portion is configured to avoid the first signal terminal group so as not to contact the first signal terminal group; the first intermediate portion comprises a first contact tab in contact with the first elastic arm of the first ground terminal and a second contact tab abutting against the first elastic arm of the second ground terminal; the first abutting elastic arm of the first grounding sheet comprises a first abutting portion abutting on the first elastic arm of the first ground terminal; the second abutting elastic arm of the first grounding sheet comprises a second abutting portion abutting on the first elastic arm of the second ground terminal; the first abutting portion and the first contact tab are disposed at intervals along the first direction; the second abutting portion and the second contact tab are disposed at intervals along the first direction.

2. The electrical connector according to claim 1, wherein along the first direction, the first abutting portion is located between the first mating portion of the first ground terminal and the first contact tab; and wherein along the first direction, the second abutting portion is located between the first mating portion of the second ground terminal and the second contact tab.

3. The electrical connector according to claim 1, wherein a width of the first abutting elastic arm of the first grounding sheet along the second direction is generally narrower than a width of the first elastic arm of the first ground terminal along the second direction; and wherein a width of the second abutting elastic arm of the first grounding sheet along the second direction is generally narrower than a width of the first elastic arm of the second ground terminal along the second direction.

4. The electrical connector according to claim 1, wherein the first intermediate portion of the first grounding sheet further comprises a first support tab extending away from the first contact tab;

the electrical connector comprises a first conductive plate pressed against the first support tab along a third direction; the third direction is perpendicular to the first direction and the second direction.

5. The electrical connector according to claim 4, wherein along the first direction, the first support tab is located between the first contact tab and the first abutting portion.

6. The electrical connector according to claim 4, wherein along the second direction, the first support tab is located between the first abutting elastic arm and the second abutting elastic arm.

7. The electrical connector according to claim 4, wherein a material of the first conductive plate is metal or conductive plastic, or a composite material in which an inner layer is plastic and an outer layer is metal.

8. The electrical connector according to claim 4, wherein the first terminal module comprises a first insulating block; the plurality of first conductive terminals are fixed to the first insulating block; the first insulating block defines a first installation groove for installing the first grounding sheet;

the first elastic arm of each first conductive terminal extends beyond the first insulating block; the first contact tab abuts against a root of the first elastic arm of the first ground terminal; the second contact tab abuts against a root of the first elastic arm of the second ground terminal.

9. The electrical connector according to claim 8, wherein the insulating body comprises a top wall; the top wall defines a first receiving space extending through the top wall along the third direction; the first receiving space communicates with the mating slot; the first terminal module is installed in the first receiving space along the third direction.

10. The electrical connector according to claim 9, wherein the first conductive plate defines a first installation hole; and the top wall comprises a first installation post inserted into the first installation hole.

11. The electrical connector according to claim 1, further comprising a second terminal module; the second terminal module comprising a plurality of second conductive terminals and a second grounding sheet; each second conductive terminal comprising a second main body portion and a second elastic arm extending from the second main body portion; the second elastic arm comprising a second mating portion protruding into the mating slot;

wherein the plurality of second conductive terminals comprise a second signal terminal group, a third ground terminal located on one side of the second signal terminal group along the second direction, and a fourth ground terminal located on another side of the second signal terminal group along the second direction; the second signal terminal group comprises a third signal terminal and a fourth signal terminal;

the second grounding sheet comprises a second body portion, a second intermediate portion connected to the second body portion, a third abutting elastic arm connected to the second intermediate portion, and a fourth abutting elastic arm connected to the second intermediate portion; the second body portion comprises a third contacting portion in contact with the second main body portion of the third ground terminal, a fourth contacting portion in contact with the second main body portion of the fourth ground terminal, and a second avoidance portion connecting the third contacting portion and the fourth contacting portion; the second avoidance portion is configured to avoid the second signal terminal group so as not to contact the second signal terminal group; the second intermediate portion comprises a third contact tab in contact with the second elastic arm of the third ground terminal, and a fourth contact tab abutting against the second elastic arm of the fourth ground terminal; the third abutting elastic arm of the second grounding sheet comprises a third abutting portion abutting on the second elastic arm of the third ground terminal; the fourth abutting elastic arm of the second grounding sheet comprises a fourth abutting portion abutting against the second elastic arm of the fourth ground terminal; the third abutting portion and the third contact tab are disposed at intervals along the first direction; the fourth abutting portion and the fourth contact tab are disposed at intervals along the first direction.

12. The electrical connector of claim 11, wherein along the first direction, the third abutting portion is located between the second mating portion of the third ground terminal and the third contact tab; and wherein along the first direction, the fourth abutting portion is located between the second mating portion of the fourth ground terminal and the fourth contact tab.

13. The electrical connector of claim 11, wherein a width of the third abutting elastic arm of the third grounding sheet along the second direction is generally narrower than a width of the second elastic arm of the third ground terminal along the second direction;

a width of the fourth abutting elastic arm of the second grounding sheet along the second direction is generally narrower than a width of the second elastic arm of the fourth ground terminal along the second direction.

14. The electrical connector of claim 11, wherein the second intermediate portion of the second grounding sheet further comprises a second support tab extending away from the third contact tab;

the electrical connector comprises a second conductive plate pressed against the second support tab along a third direction; the third direction is perpendicular to the first direction and the second direction.

15. The electrical connector of claim 14, wherein along the first direction, the second support tab is located between the third contact tab and the third abutting portion.

16. The electrical connector of claim 14, wherein along the second direction, the second support tab is located between the third abutting elastic arm and the fourth abutting elastic arm.

17. The electrical connector according to claim 14, wherein a material of the second conductive plate is metal or conductive plastic, or a composite material in which an inner layer is plastic and an outer layer is metal.

18. The electrical connector according to claim 14, wherein the second terminal module comprises a second insulating block; the plurality of second conductive terminals are fixed to the second insulating block; the second insulating block defines a second installation groove for installing the second grounding sheet;

the second elastic arm of each second conductive terminal extends beyond the second insulating block; the third contact tab abuts against a root of the second elastic arm of the third ground terminal; the fourth contact tab abuts against a root of the second elastic arm of the fourth ground terminal.

19. The electrical connector according to claim 18, wherein the insulating body comprises a bottom wall; the bottom wall defines a second receiving space extending through the bottom wall along the third direction; the second receiving space communicates with the mating slot; the second terminal module is installed in the second receiving space along the third direction.

20. The electrical connector according to claim 19, wherein the second conductive plate defines a second installation hole; and the bottom wall comprises a second installation post inserted into the second installation hole.

* * * * *